C. W. CROGAN.
LATCH RELEASE FOR TAPES.
APPLICATION FILED OCT. 16, 1920.
1,424,085.
Patented July 25, 1922.
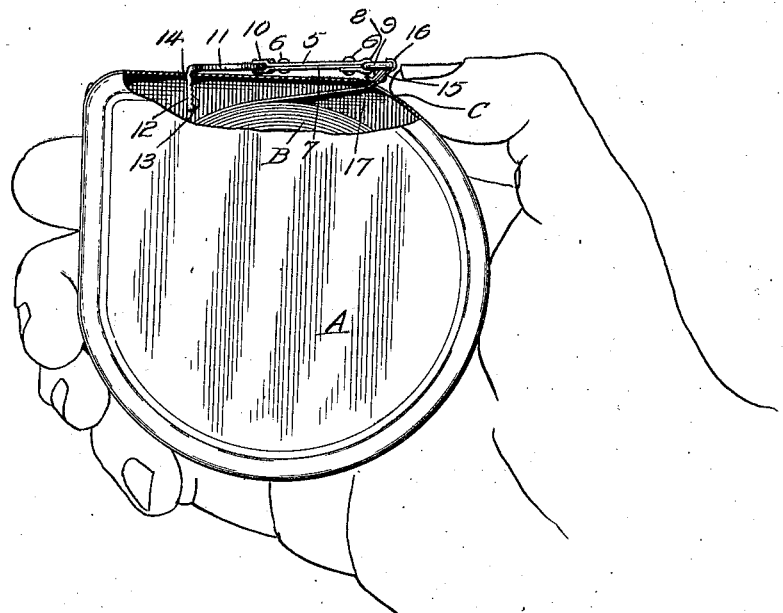
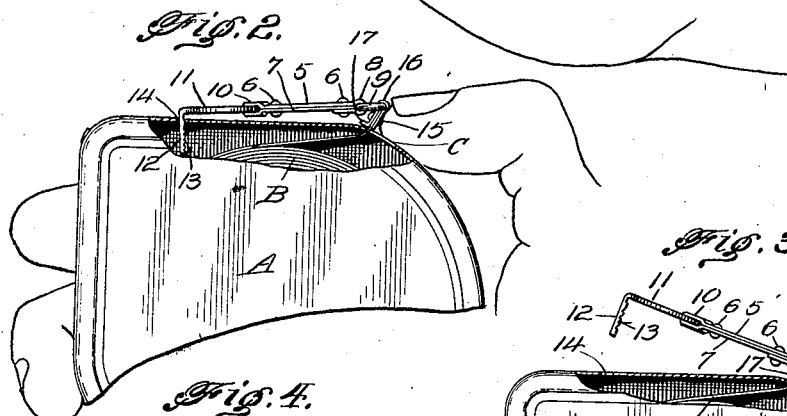
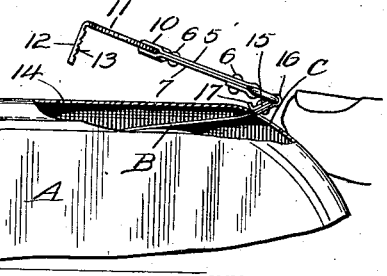
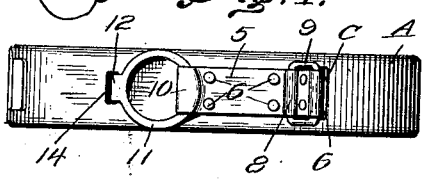
INVENTOR.
C.W. Crogan.
BY
Geo. P. Kimmel
ATTORNEY.

UNITED STATES PATENT OFFICE.

CHARLES W. CROGAN, OF BANGOR, MAINE.

LATCH RELEASE FOR TAPES.

1,424,085.  Specification of Letters Patent.  Patented July 25, 1922.

Application filed October 16, 1920. Serial No. 417,307.

*To all whom it may concern:*

Be it known that I, CHARLES W. CROGAN, a citizen of the United States, residing at Bangor, in the county of Penobscot and State of Maine, have invented certain new and useful Improvements in a Latch Release for Tapes, of which the following is a specification.

The invention relates to a latch terminal, and more particularly to the class of combined latch and releasing devices for use on measuring tapes, lines or the like.

The primary object of the invention is the provision of a device of this character, wherein the measuring tape when wound interiorly of the casing can be fastened to the latter and when it is desired to unwind or run the tape outwardly from the casing the terminal of said tape can be engaged and operated upon by the hand of the user so that the device will be automatically freed or released from the casing, thereby eliminating any difficulty in the manual release of the device, thus permitting the tape to be manipulated with dispatch and also enabling the tape measure to be handled conveniently and expeditiously.

Another object of the invention is the provision of a device of this character, wherein the terminal of the tape in the use of the tape measure is prevented from being drawn too far inwardly within the case of the latter as said terminal constitutes a stop for the tape when wound interiorly of the casing by the reel mechanism, the latch of the releasing mechanism of the terminal being of novel form so as to permit the manual latching of said terminal and the automatic releasing thereof with dispatch.

A further object of the invention is the provision of a device of this character, wherein the construction thereof not only affords the latching and releasing of the tape terminal of the tape measure, but also constitutes a hook adapted to be swung to one side of the tape line when the line is used for inside measurement and also may be used for outside measurement, the terminal being constructed and arranged when used for outside measurement so that a board or other article to be measured may be engaged by the hook forming part of the terminal and thus the free end of the line held in place.

A still further object of the invention is the provision of a device of this character, which is comparatively simple in construction, constructed and arranged to enable the easy fastening of the terminal end of the tape positively with the casing of the tape measure and the automatic releasing of said terminal end when the occasion requires, neat and attractive in appearance, strong, durable and inexpensive to manufacture and install.

Other objects will be in part obvious and in part hereinafter pointed out.

The invention accordingly consists in the features and combination of elements, the construction of which will be hereinafter exemplified in the detailed description following, and the scope of the application of which will be indicated in the following claims.

In the accompanying drawing:

Figure 1 is a side elevation of a tape measure showing the casing partly broken away with the combined latch and releasing device, constructed in accordance with the invention, applied to the terminal of the tape and fastened, with the representation of the hand of the user in position upon the casing, and its thumb located for the automatic releasing of the device.

Figure 2 is a fragmentary view similar to Figure 1 showing the thumb engaged with and operating upon the device for the initial movement thereof to effect the automatic release of said device.

Figure 3 is a fragmentary view similar to Figure 2, showing the thumb retracted and the releasing device in position of final movement for the complete automatic release thereof from engagement with the casing of the tape measure.

Figure 4 is a plan view of the tape measure showing the latch and releasing device in latched position.

Referring to the drawings in detail, A designates generally the casing, in its entirety, of a measuring tape constructed in accordance with the subject matter of Letters Patent No. 1,233,034 issued to me on or about the 10th day of July, 1917, and B the measuring tape proper which is wound upon a spring or friction reel mechanism, of the type shown and described in the aforesaid patent in the usual well-known manner, the free end of the said tape being adapted for movement through an opening C in the casing A so that said tape can be extended without or retracted within the casing in the use of the tape measure.

The latch terminal or the combined latch and releasing device constituting the present invention comprises a carrier 5 which is formed from a strip of metal having the required rigidity bent intermediate its length and having its end portions extended in overlapping relation and secured by rivets 6, thus providing a shank 7 which may be of any desired length and terminates in a bearing sleeve 8 through which a closed loop 9 is passed for the pivotal connection of the latter therewith. The forward end portion of the carrier 5 is provided with a hollow head 10 formed by extended portions of the strip in spaced relation for the reception of the ring 11 of the terminal proper, the inner wall of the head is curved to provide an arcuate bearing face which engages said ring 11 and prevents sliding movement of the ring longitudinally but permits easy rotation of the ring so that it may be turned to position a hook 12, integrally formed with said ring, in alignment with the carrier or to one side thereof as the occasion may require.

The inner face of the hook is provided with serrations or gripping teeth 13 so that the hook may obtain a firm grip upon the end of a board or other article being measured, thus preventing slipping.

The casing A is provided with a recess or aperture 14 to receive the hook 12, when the carrier is folded back against the periphery of the casing and by the serrations or teeth 13 the terminal proper can thus be secured and the carrier held fast in position as shown in Figures 1 and 4 of the drawing, thereby latching the terminal of the tape when wound within the casing A of the tape measure.

The terminal or free end of the tape B has riveted or otherwise secured thereto, a substantially U-shaped clip 15 which is folded on itself to provide a bearing sleeve 16 through which is engaged the closed loop 9, thus in this manner the latter is pivotally connected to the tape. One folded end portion of the clip 15 is bent outwardly at substantially right angles thereto to form a fulcrum nib 17, which is adapted to constitute a fulcrum for the clip 15 and also a stop for limiting the winding of the tape B within the casing A of the tape measure as will be clearly evident from Figures 1, 2 and 3 of the drawing, thus it being seen that the clip by reason of its construction and arrangement performs a dual function in the use thereof with the latch and releasing device.

The purpose of the nib 17 on the clip 15 is to afford a fulcrum foot for said clip 15, so that when the terminal proper with the ring 11 and hook 12 is latched to the casing A the said clip will be positioned as shown in Figure 1 of the drawing for the engagement of the thumb of the hand of the user of the tape measure with said clip so that when pressure of the thumb is brought to bear upon the clip the same will rock upon its fulcrum for the automatic disengagement of the hook 12 on the terminal proper from the wall of the recess or aperture 14, and upon the release of pressure upon the thumb upon said clip the device by the tension of the tape B in its wound condition will lift the latch terminal and move the same outwardly to the position as shown in Figure 3 of the drawing for the complete release of said terminal from latched engagement with the casing and thus permit the tape to be unwound or pulled outwardly of said casing in the use of the tape measure for measuring purposes.

When the latch terminal is engaged with the casing A on the tape B being completely wound therein and the nib 17 of the clip 15 contacting with the wall of the opening C for said tape and the terminal proper fastened in the aperture 14 in the casing the carrier with its adjunct parts will lie substantially close to and parallel with the adjacent face of the peripheral edge of the tape measure casing.

The combined latch and releasing device is readily engaged in the casing A of the tape measure by manually pressing the hook 12 in the aperture 14 and the tension from the tape B when completely wound will cause the positive latching of the hook 12 in said opening 14 in the casing and thereby fastening the latch terminal thereto.

From the foregoinng, it is believed that the construction and manner of operation of the combined latch and releasing device will be clearly understood and therefore, it is thought that a further explanation is unnecessary. However, reservation is herein declared relative to the use of the device as the adaptation thereof hereinbefore set forth is illustrative of an example of but one use as the device may be used for other purposes and this is contemplated within the scope of the invention.

What is claimed is:

1. In a line terminal for engagement with a casing, a latching element and a fulcrum connection between the element and the line to coact with the casing for the automatic release of said element when manually actuated.

2. In a line terminal, a carrier, a swinging connection for joining the latter with the line, latching means also secured to the carrier, and a fulcrum on the connection for said carrier, for automatically releasing the latching means.

3. In a line terminal, a carrier, a flexible connection fastened to one end of the carrier and to the line, a latching member fastened to the opposite end of the carrier, and a fulcrum on the connection for said carrier for automatically releasing the latching member.

4. In a line terminal adapted to coact with a housing therefor, a hinged carrier on the line, a fulcrum formed on the hinge of the carrier and constituting a stop, and a latching member carried by the carrier and automatically releasable from said housing by the fulcrum when said fulcrum engages the latter.

5. A line terminal adapted to coact with a housing therefor, comprising a carrier, means for connecting the carrier to a tensioned line, a latch member also connected to the carrier, and a fulcrum on the connecting means for automatically releasing the latching member and the carrier when engaged with said housing.

6. In a line terminal adapted to coact with a casing of the character described, a carrier, a freely movable member connecting the carrier to the line, a hook connected with the carrier and adapted to act as a latching means therefor and a fulcrum on the freely movable member for automatically releasing the latching means from said casing, said fulcrum being also designed to constitute a stop.

7. In combination with a line or tape and a holder therefor, of a fulcrum member attached to the end of the line, a carrier engaged with the fulcrum member and having at one end a hook or catch to engage the holder, the line or tape being adapted by drawing thereon to turn the member and release said hook from the holder when pressed forward.

8. A combined latch and releasing device for a casing comprising a carrier having a latch adapted for detachable engagement with the casing, means connected with the carrier and adapted to be secured to an extensible element to form a fulcrum for said carrier when the latching end is in latching position to permit manual manipulation of said means for the automatic release of said latching end.

9. A tape line terminal for a casing comprising a carrier, a ring on the carrier and adapted for detachable engagement with the casing for the tape line, and a fulcrum for said carrier connected with the latter and said line and manually operated for effecting the automatic release of the ring from engagement with said casing.

10. A tape line terminal for a casing comprising a carrier, a rotatable ring held in the plane of the carrier and having means for detachable engagement with the casing for the tape line, a fulcrum remote from the ring and connected with the carrier and said line and adapted for manual manipulation for the automatic release of the first named means from engagement with the casing.

11. In combination with a tape line, a casing therefor, provided with a recess of a carrier connected to the terminal of the tape line, a ring carried by the carrier, an angularly directed hook carried by the ring and engageable in the recess for maintaining the ring and carrier latched thereto, and a fulcrum included in the connection between the carrier and tape line and forming a manually operated element for effecting the automatic release of the hook in the recess.

12. In combination with a tape line and casing therefor provided with a recess of a carrier secured to the terminal of the tape line, a ring secured to the carrier, an angularly directed hook carried by the ring engageable in the recess, gripping teeth on the hook, and adapted to co-act with the wall of the recess to prevent accidental displacement of the ring from the casing, a clip included in the connection between the carrier and the tape line and forming a fulcrum for manual manipulation to effect the release of the hook from engagement in the recess.

13. The combination with a tape line and casing therefor, of a terminal latch and releasing device comprising means for latching engagement with a casing and carried by the end of the tape line, and means forming a connection between said first-named means and the tape line and constituting a fulcrum adapted for manual operation to effect the automatic release of the said first named means from engagement with the casing.

14. The combination with a tape line and casing therefor, of a combined latch and releasing device constructed and arranged exteriorly of the casing and adapted for detachable engagement with the latter, and means co-operative with the said device and constituting a connection between the tape line and said device and providing a stop and fulcrum to limit the movement of the tape line in one direction and also to permit manual operation of the device for the 15. A line terminal comprising a carrier connecting the line end, and a latching means mounted on said carrier, said latching means being actuated to released position when flexing movement of the connected end of said carrier is effected.

16. A line terminal comprising a carrier connecting the line end, and a latching means cooperative with said carrier, said latching means being actuated to released position when flexing movement of the connected end of said carrier is effected.

In testimony whereof, I affix my signature hereto.

CHARLES W. CROGAN.